Oct. 31, 1961  N. NELSON  3,006,596
FLAPPER VALVE
Filed July 24, 1959
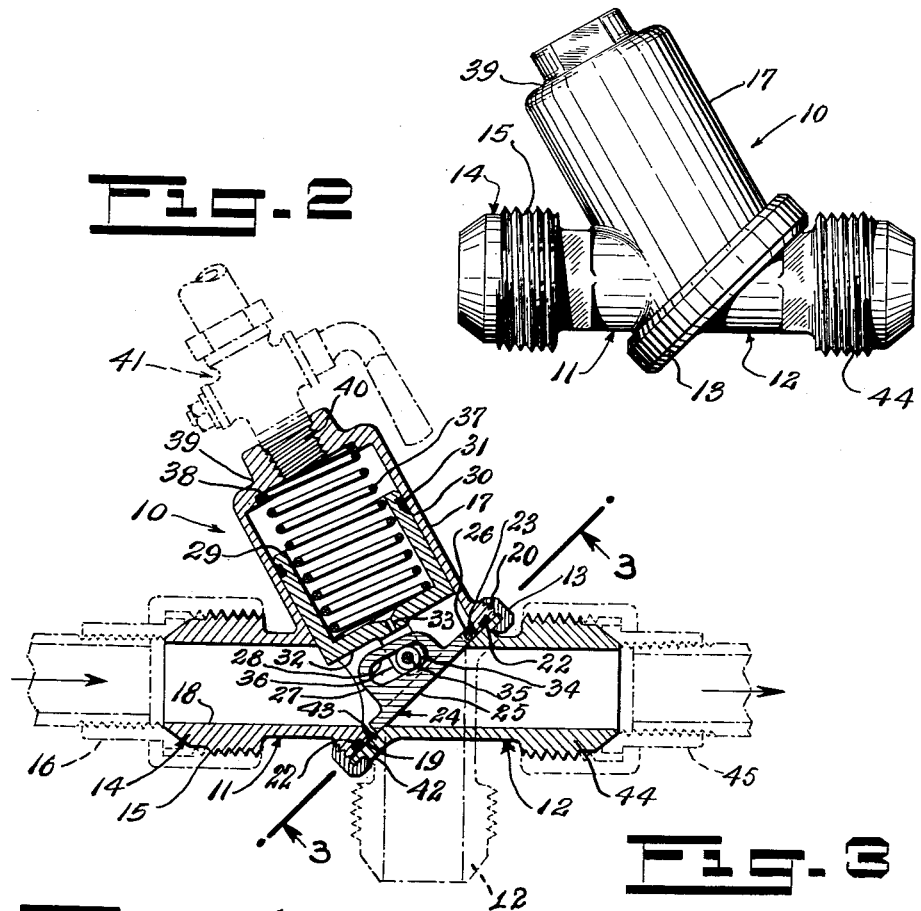
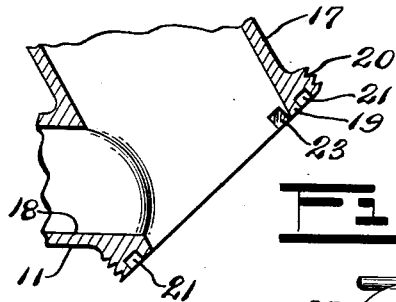
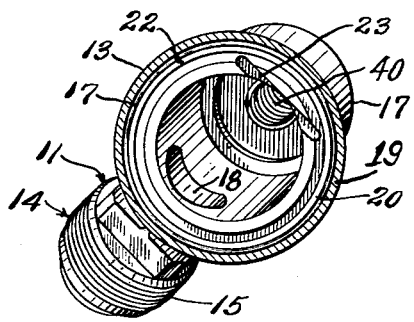
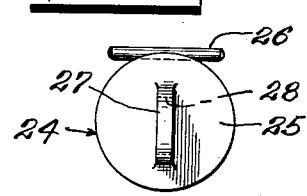
INVENTOR.
NORMAN NELSON
BY
H. G. Manning
ATTORNEY

3,006,596
FLAPPER VALVE

Norman Nelson, West Hartford, Conn., assignor to Flo-Control Company, Plainville, Conn., a corporation of Connecticut
Filed July 24, 1959, Ser. No. 829,333
1 Claim. (Cl. 251—33)

This invention relates to valves and is directed particularly to a fluid flow control flapper valve including flow control mechanism actuated by the pressure of the fluid in the flow system under control.

One object of this invention is to provide a flapper valve of the above nature, wherein the actuating mechanism is integrally formed with the flapper valve, thereby eliminating the need of separate actuators.

Another object of the invention is to provide a flapper valve of the above nature, wherein the energy source for actuating the valve flapper in opening or closing the valve is derived from the pressure of the fluid in the flow controlled system.

Another object of the invention is to provide a flapper valve of the character described, which will operate in pneumatic as well as hydraulic flow systems, and which is also well adapted to operate either under high or low fluid pressures and temperatures.

Another object of the invention is to provide a flapper valve of the above nature, wherein the relative angular disposition of the inlet and outlet fittings can be adjusted anywhere up to 360 degrees, thereby greatly simplifying installation.

Still another object is to provide a flapper valve of the above nature which will be simple in construction, low in cost, foolproof in operation, small in size, light in weight, adaptable to use with a wide variety of gasses or liquids, and which will be attractive in appearance and long wearing in use.

Other objects, features and advantages of the invention will be apparent from the following description, when read with reference to the accompanying drawings.

In the drawings, wherein like reference numerals denote corresponding parts throughout the several views:

FIG. 1 is a side elevational view of a flapper valve embodying the invention.

FIG. 2 is a vertical cross-sectional view of the valve shown in FIG. 1.

FIG. 3 is an oblique view of the valve, taken along the line 3—3 of FIG. 2, looking in the direction of the arrows.

FIG. 4 is a fragmentary vertical cross-sectional view of the body member of the valve, and FIG. 5 is a front view of the valve flapper member, shown separately.

Referring now in detail to the drawings, the numeral 10 designates the novel flapper valve generally, the same comprising a body member 11 and an outlet adapter member 12 adjustably connected together by an annular knurled nut 13, in the manner hereinbelow described. The body member 11, the adapter member 12, and the nut 13 are preferably formed of stainless steel if the valve is to be used in high pressure systems, but may be of aluminum or brass if used under low or moderate pressures.

The body member 11 comprises a tubular inlet portion 14, the outer end of which is threaded as at 15 to receive an inlet conduit fitting indicated in broken lines at 16 (FIG. 2). The body member 11 also includes a cylindrical housing portion 17 integral with said tubular inlet portion 14 and inclined with respect thereto at an angle of about 45 degrees. The cylindrical housing portion 17 of the body member 11 is formed with a cylindrical opening 18, the inner end of which communicates with the inner end of the inlet portion 14 thereof, forming a circular flange portion 19 inclined at an angle of substantially 45 degrees with the longitudinal axis of said tubular inlet portion 14.

The flange portion 19 is exteriorly threaded, as indicated at 20, to receive the internally-threaded annular nut 13, and is formed with an annular groove 21 seated within which is a rubber or neoprene O-ring 22 serving as a gasket between the body member 11 and the adapter member 12. As best illustrated in FIGS. 2 and 4, the flange portion 19 of the body member 11 is also formed with a straight transverse groove 23 at the juncture of the inlet portion 14 and the piston housing portion 17 thereof, the ends of said groove 23 serving to receive the ends of a flapper hinge pin 26 as is hereinbelow more fully described.

The valve 10 further embodies a flapper member 24 comprising a circular disc body 25, preferably of stainless steel having the hinge pin 26 welded in tangential relation to the edge of said disc body 25, and an upstanding cam lug 27 welded to one side of said disc body and extending substantially perpendicularly to the hinge pin 26. The cam lug 27 is formed with an inclined oval cam opening 28.

Slidably fitted within the cylindrical opening 18 of the piston housing portion 17 is a hollow cylindrical piston 29, the open end of which extends outwardly and is formed with a peripheral groove 30 seated within which is a rubber or neoprene O-ring 31.

The closed end head 32 of the piston 29 is provided with a small central bleed orifice for a purpose to be later explained, and the piston 29 is secured to the flapper member 24 by means of a hollow cylindrical roller 34 slidably constrained within the cam opening 28 of the flapper cam lug 27 and rotatably journalled on a roller pin 35 supported at each end in a pair of spaced support lugs 36 (one of which is shown in FIG. 2) extending outwardly of the piston head 32 at each side of the bleed orifice 33 therein.

The piston 29 is normally held in its lowermost or closed position by means of a helical spring 37 located between the inside of the piston head 32 and a cylindrical recess 38 formed in the outer end 39 of the piston housing portion 17 of the body member 11. The outer end 39 of the piston housing portion 17 is centrally drilled and tapped as indicated at 40 to receive a shut-off valve 41, shown in broken lines (in FIG. 2).

The outlet adapter member 12 is formed at its inner end with a circular flange portion 42 inclined at an angle of 45 degrees with the longitudinal axis thereof, and providing a flat circular surface portion 43 seatable against the circular flange portion 19 of the body member 11.

The annular nut 13 serves to clamp the outlet adapter member 12 in any desired angular position relative the body member 11, from the straight line position shown in full lines in FIG. 2 to the right angular position shown in broken lines in FIG. 2. The adapter member 12 is formed with a threaded outer end 44 to receive an outlet conduit fitting indicated in broken lines at 45 (FIG. 2).

Operation

In operation, fluid under pressure, either pneumatic or hydraulic, will be supplied to the inlet portion 14 of the valve by connection from the inlet conduit 16 to the threaded end 15 thereof. Assuming the shut-off valve 41 to be closed, the pressure of the fluid against the back of the flapper member 24, in addition to the force of the spring 37 will forcefully seat said flapper member against the flat surface portion 43 of the outlet adapter member 12, thereby shutting off flow through said outlet adapter member. Because of the bleed orifice 33, fluid pressure will be equalized at both sides of the piston head 32, and hence will not affect the position of the piston 29.

When the shut-off valve 41 is opened, the pressure on the outer end of the piston 29 will be relieved, and the fluid pressure at the inlet side of the flapper valve 10 will cause said piston to move upwardly in the housing portion 17 of the body member 11 against the force of the spring 37. This is true because the area of the piston head 32 is substantially greater than the area of the circular disc body 25 of the flapper member 24. The flapper member 24 will thus be withdrawn upwardly into the lower end of the interior cylindrical opening 18 of the piston housing portion 17, allowing unimpeded fluid flow through the outlet adapter member 12. Upon closure of the shut-off valve 41, fluid pressure will build up again behind the piston head 32 to equalize the front and back pressures thereon by the bleed orifice 33 to allow the spring 37 to move the piston down into valve closing position.

While a manually actuated shut-off valve 41 is shown in FIG. 2, it will readily be evident it is within the scope of this invention to employ a solenoid to energize the flapper valve.

While there has been disclosed in this specification one form in which the invention may be embodied, it is to be understood that this form is shown for the purpose of illustation only, and that the invention is not limited to the specific disclosure, but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

A fluid flow valve assembly comprising, in combination, a body member having a flow passage therethrough including inlet and outlet openings, a valve seat surrounding said flow passage and inclined at an angle of 45° to the axis of said inlet opening, a disk like flapper valve pivotally mounted for engagement with said valve seat to arrest fluid flow through said valve, said flapper valve having on one side an inclined cam slot, a control cylinder integral with said body member, a cup-shaped piston slidably fitted in said cylinder and defining with said cylinder an expansible chamber communicating with the upstream side of said seat through a bleed hole formed in said piston, a pair of parallel lugs fixed to said piston and carrying a cross pin, a roller journalled on said cross pin and slidably mounted in said inclined cam slot, a spring positioned in said chamber urging said piston and flapper valve to a seat engaging position, a shut-off valve controlling flow through a vent conduit communicating with said chamber whereby in the open position of said shut-off valve said chamber is vented resulting in rapid opening of said flapper valve and in the closed position of said shut-off valve equalization of fluid pressure on opposite sides of said piston is obtained by means of said bleed hole resulting in said flapper valve being urged to seat engagement position under the bias of said spring.

References Cited in the file of this patent

UNITED STATES PATENTS

| | | |
|---|---|---|
| 267,461 | Roche | Nov. 14, 1882 |
| 741,267 | Neubling | Oct. 13, 1903 |
| 858,063 | Delany | June 25, 1907 |
| 2,356,990 | Getz | Aug. 29, 1944 |